United States Patent
Suzuki et al.

(10) Patent No.: US 11,027,579 B2
(45) Date of Patent: *Jun. 8, 2021

(54) PNEUMATIC TIRE

(71) Applicant: The Yokohama Rubber Co., LTD., Tokyo (JP)

(72) Inventors: Naoko Suzuki, Hiratsuka (JP); Hiromitsu Takei, Hiratsuka (JP)

(73) Assignee: The Yokohama Rubber Co., LTD.

( * ) Notice: Subject to any disclaimer, the term of this patent is extended or adjusted under 35 U.S.C. 154(b) by 606 days.

This patent is subject to a terminal disclaimer.

(21) Appl. No.: 15/505,038

(22) PCT Filed: Aug. 3, 2015

(86) PCT No.: PCT/JP2015/071955
§ 371 (c)(1),
(2) Date: Feb. 17, 2017

(87) PCT Pub. No.: WO2016/027648
PCT Pub. Date: Feb. 25, 2016

(65) Prior Publication Data
US 2017/0274708 A1    Sep. 28, 2017

(30) Foreign Application Priority Data
Aug. 19, 2014 (JP) .............. JP2014-166831

(51) Int. Cl.
*B60C 11/12* (2006.01)
*B60C 11/03* (2006.01)

(52) U.S. Cl.
CPC .......... *B60C 11/0302* (2013.01); *B60C 11/03* (2013.01); *B60C 11/0304* (2013.01);
(Continued)

(58) Field of Classification Search
CPC . B60C 11/1204; B60C 11/1236; B60C 11/12; B60C 11/0304; B60C 2011/0381; B60C 2011/0383

See application file for complete search history.

(56) References Cited

U.S. PATENT DOCUMENTS 2,272,879 A * 2/1942 Hargraves ........... B60C 11/0309
152/209.22
D304,918 S * 12/1989 Hinrichsen .................. D12/597
(Continued)

FOREIGN PATENT DOCUMENTS

CN 102007006 4/2011
EP 618091 A1 * 10/1994
(Continued)

OTHER PUBLICATIONS

Machine translation for Japan 2006-240591 (Year: 2019).*
(Continued)

*Primary Examiner* — Steven D Maki
(74) *Attorney, Agent, or Firm* — Thorpe North & Western

(57) ABSTRACT

A pneumatic tire includes in a land portion (center land portion 4A) defined by a first circumferential groove (3A) and a second circumferential groove (3B), narrow grooves (third narrow grooves 6C) formed as one set of two grooves provided intersecting the tire circumferential direction and arranged side by side in the tire circumferential direction, communicating with the first circumferential groove (3A) and terminating in the center land portion (4A); and auxiliary grooves (fifth auxiliary grooves 5E) provided intersecting the tire circumferential direction communicating with the second circumferential groove (3B) and terminating within the center land portion (4A) with the positions of the terminating end portions disposed between the terminating
(Continued)

end portions of the set of the third narrow grooves (6C) in the tire circumferential direction.

12 Claims, 9 Drawing Sheets

(52) U.S. Cl.
CPC .......... *B60C 11/0306* (2013.01); *B60C 11/12* (2013.01); *B60C 11/1204* (2013.01); *B60C 11/1236* (2013.01); *B60C 2011/036* (2013.01); *B60C 2011/0346* (2013.01); *B60C 2011/0353* (2013.01); *B60C 2011/0381* (2013.01); *B60C 2011/0383* (2013.01); *B60C 2011/1209* (2013.01)

(56) References Cited

U.S. PATENT DOCUMENTS

| D372,891 | S | * | 8/1996 | McKisson | D12/528 |
| D718,219 | S | * | 11/2014 | Berzins | D12/516 |
| D724,005 | S | * | 3/2015 | Hughes | D12/515 |
| D772,146 | S | * | 11/2016 | Tikka | D12/523 |
| 2003/0226629 | A1 | * | 12/2003 | Kimishima | B60C 11/0306 152/209.18 |
| 2008/0185084 | A1 | * | 8/2008 | Dumigan | B60C 11/0306 152/209.15 |
| 2010/0252159 | A1 | * | 10/2010 | Mukai | B60C 11/0302 152/209.25 |
| 2011/0005653 | A1 | | 1/2011 | Ebiko | |
| 2012/0067477 | A1 | * | 3/2012 | Berzins | B60C 11/1392 152/209.15 |
| 2012/0145295 | A1 | | 6/2012 | Yamada | |
| 2012/0285591 | A1 | * | 11/2012 | Nagayasu | B60C 11/1236 152/209.8 |
| 2013/0133797 | A1 | * | 5/2013 | Takagi | B60C 11/03 152/209.8 |
| 2018/0079260 | A1 | * | 3/2018 | Suzuki | B60C 11/0302 |

FOREIGN PATENT DOCUMENTS

| EP | 1 361 075 | | 11/2003 |
| JP | 06-017602 Y2 | * | 5/1994 |
| JP | 07-164826 A | * | 6/1995 |
| JP | 2003-326919 | | 11/2003 |
| JP | 2006-240591 A | * | 9/2006 |
| JP | 2012-126214 | | 7/2012 |
| JP | 2012-236510 | | 12/2012 |
| JP | 2013-107492 | | 6/2013 |
| JP | 2013-112061 | | 6/2013 |
| WO | WO 2009/130936 | | 10/2009 |

OTHER PUBLICATIONS

Machine translation for Japan 07-164826 (Year: 2019).*
Machine translation for Europe 618091 (Year: 2019).*
Machine translation for Japan 06-017602 Y2 (Year: 2020).*
International Search Report for International Application No. PCT/JP2015/071955 dated Oct. 27, 2015, 2 pages, Japan.

* cited by examiner

| | | CONVENTIONAL EXAMPLE 1 | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 |
|---|---|---|---|---|---|---|---|---|
| THIRD NARROW GROOVE | ARRANGEMENT | SINGLE | SET: PARALLEL | SET: PARALLEL | SET: PARALLEL | SET: NARROW | SET: WIDE | SET: WIDE |
| | GROOVE WIDTH RELATIVE TO FIFTH AUXILIARY GROOVE | SAME | SAME | WIDER | NARROWER | NARROWER | NARROWER | NARROWER |
| | ANGLE A | - | 0 | 0 | 0 | - | 80 | 10 |
| | DIFFERENT STRAIGHT LINES OR CURVES | - | - | - | - | - | - | - |
| | 3 REFERENCE LINES | - | - | - | - | - | - | - |
| | ANGLE a, b | 0 | 0 | 0 | 0 | 0 | 0 | 0 |
| | ANGLE c, d | 0 | 0 | 0 | 0 | 0 | 0 | 0 |
| FIFTH AUXILIARY GROOVE | ARRANGEMENT RELATIVE TO THIRD NARROW GROOVES | PARALLEL | PARALLEL | PARALLEL | PARALLEL | NOT PARALLEL | NOT PARALLEL | NOT PARALLEL |
| | GROOVE WIDTH RELATIVE TO THIRD NARROW GROOVES | SAME | SAME | NARROWER | WIDER | WIDER | WIDER | WIDER |
| | ANGLE α | - | 0 | 0 | 0 | - | 50 | 9 |
| | ANGLE β | - | 0 | 0 | 0 | - | 30 | 1 |
| | GROOVE WIDTH | PARALLEL | PARALLEL | PARALLEL | PARALLEL | PARALLEL | PARALLEL | PARALLEL |
| GROOVE WIDTH OF SECOND CIRCUMFERENTIAL GROOVE | | SAME AS OTHERS | SAME AS OTHERS | SAME AS OTHERS | NARROWER | NARROWER | NARROWER | NARROWER |
| LAND PORTION ARRANGEMENT | | MIDDLE | MIDDLE | MIDDLE | MIDDLE | MIDDLE | MIDDLE | MIDDLE |
| GROOVE WIDTH OF NARROW GROOVES | | 1.0 | 1.5 | 1.5 | 1.5 | 1.5 | 1.5 | 1.5 |
| BRAKING PERFORMANCE ON SNOW-COVERED ROAD SURFACES | | 100 | 100 | 103 | 105 | 105 | 106 | 106 |
| BRAKING PERFORMANCE ON WET ROAD SURFACES | | 100 | 103 | 103 | 103 | 103 | 105 | 105 |
| BRAKING PERFORMANCE ON DRY ROAD SURFACES | | 100 | 100 | 100 | 100 | 103 | 103 | 103 |

FIG. 7A

|  |  | WORKING EXAMPLE 7 | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 |
|---|---|---|---|---|---|---|---|---|
| THIRD NARROW GROOVE | ARRANGEMENT | SET: WIDE | SET: WIDE | SET: WIDE | SET: WIDE | SET: WIDE | SET: WIDE | SET: WIDE |
|  | GROOVE WIDTH RELATIVE TO FIFTH AUXILIARY GROOVE | NARROWER | NARROWER | NARROWER | NARROWER | NARROWER | NARROWER | NARROWER |
|  | ANGLE A | 50 | 30 | 30 | 30 | 30 | 30 | 30 |
|  | DIFFERENT STRAIGHT LINES OR CURVES | - | - | - | ZIGZAG | WAVY | - | - |
|  | 3 REFERENCE LINES | - | - | - | - | - | GOOD | GOOD |
|  | ANGLE a, b | 0 | 0 | 0 | - | - | 3 | 5 |
|  | ANGLE c, d | 0 | 0 | 0 | - | - | 3 | 5 |
| FIFTH AUXILIARY GROOVE | ARRANGEMENT RELATIVE TO THIRD NARROW GROOVES | NOT PARALLEL | NOT PARALLEL | NOT PARALLEL | NOT PARALLEL | NOT PARALLEL | NOT PARALLEL | NOT PARALLEL |
|  | GROOVE WIDTH RELATIVE TO THIRD NARROW GROOVES | WIDER | WIDER | WIDER | WIDER | WIDER | WIDER | WIDER |
|  | ANGLE α | 30 | 25 | 25 | 25 | 25 | 25 | 25 |
|  | ANGLE β | 20 | 5 | 5 | 5 | 5 | 5 | 5 |
|  | GROOVE WIDTH | PARALLEL | PARALLEL | PARALLEL | PARALLEL | PARALLEL | PARALLEL | PARALLEL |
| GROOVE WIDTH OF SECOND CIRCUMFERENTIAL GROOVE |  | NARROWER | NARROWER | NARROWER | NARROWER | NARROWER | NARROWER | NARROWER |
| LAND PORTION ARRANGEMENT |  | MIDDLE | MIDDLE | MIDDLE | MIDDLE | MIDDLE | MIDDLE | MIDDLE |
| GROOVE WIDTH OF NARROW GROOVES |  | 1.5 | 1.5 | 1.5 | 1.5 | 1.5 | 1.5 | 1.5 |
| BRAKING PERFORMANCE ON SNOW-COVERED ROAD SURFACES |  | 106 | 108 | 109 | 110 | 110 | 113 | 113 |
| BRAKING PERFORMANCE ON WET ROAD SURFACES |  | 107 | 107 | 107 | 108 | 110 | 110 | 110 |
| BRAKING PERFORMANCE ON DRY ROAD SURFACES |  | 103 | 104 | 104 | 105 | 105 | 105 | 106 |

FIG. 7B

| | | WORKING EXAMPLE 14 | WORKING EXAMPLE 15 | WORKING EXAMPLE 16 | WORKING EXAMPLE 17 | WORKING EXAMPLE 18 | WORKING EXAMPLE 19 |
|---|---|---|---|---|---|---|---|
| THIRD NARROW GROOVE | ARRANGEMENT | SET: WIDE | SET: WIDE | SET: WIDE | SET: WIDE | SET: WIDE | SET: WIDE |
| | GROOVE WIDTH RELATIVE TO FIFTH AUXILIARY GROOVE | NARROWER | NARROWER | NARROWER | NARROWER | NARROWER | NARROWER |
| | ANGLE A | 30 | 30 | 30 | 30 | 30 | 30 |
| | DIFFERENT STRAIGHT LINES OR CURVES | - | - | - | - | - | - |
| | 3 REFERENCE LINES | GOOD | GOOD | GOOD | GOOD | GOOD | GOOD |
| | ANGLE a, b | 20 | 10 | 10 | 10 | 10 | 10 |
| | ANGLE c, d | 20 | 10 | 10 | 10 | 10 | 10 |
| FIFTH AUXILIARY GROOVE | ARRANGEMENT RELATIVE TO THIRD NARROW GROOVES | NOT PARALLEL | NOT PARALLEL | NOT PARALLEL | NOT PARALLEL | NOT PARALLEL | NOT PARALLEL |
| | GROOVE WIDTH RELATIVE TO THIRD NARROW GROOVES | WIDER | WIDER | WIDER | WIDER | WIDER | WIDER |
| | ANGLE α | 25 | 25 | 25 | 25 | 25 | 25 |
| | ANGLE β | 5 | 5 | 5 | 5 | 5 | 5 |
| | GROOVE WIDTH | PARALLEL | GRADUALLY NARROWS TOWARDS TERMINATING END SIDE | GRADUALLY NARROWS TOWARDS TERMINATING END SIDE | GRADUALLY NARROWS TOWARDS TERMINATING END SIDE | GRADUALLY NARROWS TOWARDS TERMINATING END SIDE | GRADUALLY NARROWS TOWARDS TERMINATING END SIDE |
| GROOVE WIDTH OF SECOND CIRCUMFERENTIAL GROOVE | | NARROWER | NARROWER | NARROWER | NARROWER | NARROWER | NARROWER |
| LAND PORTION ARRANGEMENT | | MIDDLE | MIDDLE | CENTER | CENTER | CENTER | CENTER |
| GROOVE WIDTH OF NARROW GROOVES | | 1.5 | 1.5 | 1.5 | 0.4 | 1.2 | 1.0 |
| BRAKING PERFORMANCE ON SNOW-COVERED ROAD SURFACES | | 115 | 116 | 117 | 117 | 118 | 110 |
| BRAKING PERFORMANCE ON WET ROAD SURFACES | | 110 | 113 | 113 | 114 | 115 | 115 |
| BRAKING PERFORMANCE ON DRY ROAD SURFACES | | 107 | 108 | 109 | 109 | 110 | 110 |

FIG. 7C

PNEUMATIC TIRE

TECHNICAL FIELD

This technology relates to a pneumatic tire that achieves braking performance on dry road surfaces, wet road surfaces, and snow-covered road surfaces.

BACKGROUND ART

Conventionally, pneumatic tires are known having two circumferential grooves extending in the tire circumferential direction provided arranged side by side in the tire width direction, and lateral grooves in the land portion between the circumferential grooves extending in the tire width direction from the circumferential grooves on the tread surface.

For example, the pneumatic tire as described in Japanese Unexamined Patent Application Publication No. 2012-126214A aims to improve performance on snow roads while maintaining steering stability on dry road surfaces. This pneumatic tire has lateral grooves that include narrow grooves and/or sipes provided in the land portion between two circumferential grooves that extend over the full width of the land portion and are arranged in a zigzag manner.

Also, for example, the pneumatic tire as described in Japanese Unexamined Patent Application Publication No. 2013-107492A aims to achieve a high level of both water drainage properties and steering stability. This pneumatic tire has first inclined grooves in a land portion between two circumferential grooves, extending at an incline to the tire width direction from one of the circumferential grooves and terminating within the land portion, and second inclined grooves extending at an incline to the tire width direction from the other of the circumferential grooves and terminating within the land portion. These first inclined grooves and second inclined grooves are formed alternately in the tire circumferential direction. In addition, this pneumatic tire has first circumferential sipes extending in the tire circumferential direction from the end portion on the land portion side of the first inclined grooves to an intermediate position on the second inclined grooves, and second circumferential sipes extending from an intermediate position on the second inclined grooves along an extension line of the first circumferential sipe and terminating within the land portion.

In the pneumatic tire of Japanese Unexamined Patent Application Publication No. 2012-126214A as described above, by arranging the lateral grooves across the whole width of the land portion in a zigzag manner, rectangular blocks formed by two lateral grooves extending in the same direction are formed into triangular blocks by being divided at an inclination by the lateral grooves extending in a different direction. Therefore the stiffness of the land portion tends to be reduced, so the braking performance on dry road surfaces is insufficient.

Also, the pneumatic tire of Japanese Unexamined Patent Application Publication No. 2013-107492A as described above has first circumferential sipes and second circumferential sipes, but because they extend in the circumferential direction, an edge effect cannot be expected, so the braking performance on snow-covered road surfaces is insufficient.

SUMMARY

The present technology provides a pneumatic tire that can achieve braking performance on dry road surfaces, wet road surfaces, and snow-covered road surfaces.

The pneumatic tire of a first example includes: a first circumferential groove and a second circumferential groove on a tread surface of a tread portion, extending along a tire circumferential direction, and sandwiching a tire equatorial plane;

a land portion defined by the first circumferential groove and the second circumferential groove;

narrow grooves formed as sets of two grooves provided intersecting the tire circumferential direction, communicating with the first circumferential groove, and terminating within the land portion; and an auxiliary groove provided intersecting the tire circumferential direction, communicating with the second circumferential groove, terminating within the land portion, the terminating end portion thereof being disposed between the terminating end portions of the set of the narrow grooves in the tire circumferential direction.

According to this pneumatic tire, the auxiliary groove enhances the water drainage properties, so the braking performance on wet read surfaces can be improved. Moreover, the edge effect is improved by the narrow grooves, so the braking performance on snow-covered road surfaces can be improved. Moreover, the narrow grooves and the auxiliary grooves terminate within the land portion, and the positions of the terminating end portion of the auxiliary grooves are arranged between the end portions of the sets of narrow grooves in the tire circumferential direction, so the stiffness of the land portion is improved, and the braking performance on dry road surfaces can be improved.

Also, the pneumatic tire of a second example is a tire according to the first example in which the groove width of the second circumferential groove is formed narrower than that of the first circumferential groove, and the groove width of the narrow grooves is formed narrower than that of the auxiliary groove.

According to this pneumatic tire, by making the groove width of the second circumferential groove narrower, the stiffness of the land portions on both sides can be increased, but the water drainage properties tend to be reduced. This reduction in water drainage properties can be compensated for by the auxiliary grooves which have a wide groove width. Also, the narrow grooves which communicate with the first circumferential groove which has a wide groove width are formed with a narrower groove width than the auxiliary grooves, so stiffness balance is provided in the land portion between the first circumferential groove and the second circumferential groove, and uneven wear can be reduced.

Also, the pneumatic tire according of a third example is a tire according to the first or second example in which the sets of two narrow grooves are formed extending from the communicating end portions towards the terminating end portions spreading with an angle in a range not less than 10° and not greater than 50°, and the auxiliary groove is formed extending from the terminating end portion towards the communicating end portion at an angle in a range not less than 9° and not greater than 30° with respect to a first of the set of two narrow grooves, and at an angle in a range not less than 1° and not greater than 20° with respect to the second.

According to this pneumatic tire, the set of two narrow grooves is formed spreading as it extends away from the auxiliary groove, so the reduction in stiffness of the land portion is suppressed, and the effect of improvement of braking performance on snow-covered road surfaces can be enhanced by the edge effect of the narrow groove. Here, when the angle opened between the two grooves of the set of narrow grooves is less than 10°, the narrow grooves approach parallel, so it is difficult to suppress the reduction in land portion stiffness. On the other hand, when the angle opened between the two grooves of the set of narrow grooves exceeds 50°, they approach the tire circumferential direction, so it is difficult to obtain the edge effect. Therefore, preferably the set of two narrow grooves is formed spreading as it extends from the communicating end portion towards the terminating end portion with the angle in a range not less than 10° and not more than 50°. Also if the angle between the auxiliary groove and the first of the narrow grooves is less than 9°, the auxiliary groove and the first of the narrow grooves approach parallel, so it is difficult to suppress the reduction in land portion stiffness. On the other hand, if the angle between the auxiliary groove and the first of the narrow grooves exceeds 30°, the angle between the auxiliary groove and the second of the narrow grooves approaches parallel, so it is difficult to suppress the reduction in land portion stiffness. Also if the angle between the auxiliary groove and the second of the narrow grooves is less than 1°, the auxiliary groove and the second of the narrow grooves approach parallel, so it is difficult to suppress the reduction in land portion stiffness. On the other hand, if the angle between the auxiliary groove and the second of the narrow grooves exceeds 20°, the angle between the auxiliary groove and the first of the narrow grooves approaches parallel, so it is difficult to suppress the reduction in land portion stiffness. Therefore preferably the auxiliary groove extends from the terminating end portion towards the communicating end portion with an angle with respect to the first of the set of two narrow grooves in the range not less than 9° and not greater than 30°, and the angle with respect to the second formed in the range not less than 1° and not greater than 20°.

Also, the pneumatic tire of a fourth example is the tire according to any one of the first to third examples in which the narrow grooves are formed based on two or more continuous different straight lines or curved lines.

According to this pneumatic tire, by forming the narrow groove based on two or more continuous different straight lines or curves, the edge effect produced by the narrow groove is improved, so the effect of improvement of braking performance on snow-covered road surfaces can be enhanced.

Also, the pneumatic tire of a fifth example is the tire according to any one of the first to third examples in which the narrow grooves are formed smoothly and continuously of three reference lines in the order of a first reference line, a second reference line, and a third reference line in that order from the communicating end portion towards the terminating end portion.

According to this pneumatic tire, by forming the narrow groove smoothly and continuously of the three reference lines, collapse of the land portion can be reduced, and the effect of improvement of braking performance on dry road surfaces can be enhanced. Moreover, by forming the narrow groove smoothly and continuously of each of the reference lines, the strength of the narrow groove itself is increased, so the grip properties are good, and the effect of improving the braking performance on dry road surfaces can be enhanced.

Also, the pneumatic tire of a sixth example is the tire according to the fifth example in which the set of narrow grooves is formed so that the first reference line extends from the communicating end portion to the inner side with respect to straight lines connected from the communicating end portions to the terminating end portions, and the first reference line and the straight lines form an angle in a range not less than 5° and not greater than 20°.

If the angle of the first reference lines, that extend from the communicating end portions with respect to the straight lines that connect the communicating end portions and the terminating end portions, in other words with respect to the overall extension direction of the narrow grooves, is less than 5°, the narrow grooves approach a straight line, so it is difficult to obtain the effect of reducing the collapse of the land portion. On the other hand, when the angle between the first reference line and the straight line exceeds 20°, the narrow groove deviates greatly from its overall extension direction, so it is difficult to obtain the effects of good grip properties and to increase the strength of the third narrow groove itself. Therefore, by forming the angle between the narrow groove and the first reference line in the range not less than 5° and not greater than 20°, the effects of reduction in collapse of the land portion and improvement in braking performance on dry road surfaces can be further enhanced, the strength of the narrow groove itself can be increased, and the effect of improvement in the braking performance on dry road surfaces can be further enhanced.

Also, the pneumatic tire of a seventh example is the tire according to the fifth or sixth example in which the set of narrow grooves is formed so that the third reference line extends from the terminating end portion to the inner side with respect to straight lines connected from the communicating end portions to the terminating end portions, and the third reference line and the straight lines form an angle in a range not less than 5° and not greater than 20°.

If the angle of the third reference lines, that extend from the terminating end portions with respect to the straight lines that connect the communicating end portions and the terminating end portions, in other words with respect to the overall extension direction of the narrow grooves, is less than 5°, the narrow grooves approach a straight line, so it is difficult to obtain the effect of reducing the collapse of the land portion. On the other hand, when the angle between the third reference line and the straight line exceeds 20°, the narrow groove deviates greatly from its overall extension direction, so it is difficult to obtain the effects of good grip properties and to increase the strength of the third narrow groove itself. Therefore, by forming the angle between the narrow groove and the third reference line in the range not less than 5° and not greater than 20°, the effects of reduction in collapse of the land portion and improvement in braking performance on dry road surfaces can be further enhanced, the strength of the narrow groove itself can be increased, and the effect of improvement in the braking performance on dry road surfaces can be further enhanced.

Also, the pneumatic tire of an eighth example is the tire according to any one of the first to seventh examples in which the auxiliary grooves are formed with a groove width gradually narrowing from the communicating end portion towards the terminating end portion.

According to this pneumatic tire, by forming the auxiliary groove so that the tip becomes narrower towards within the land portion, the ground contact area of the land portion can be ensured, and the effect of improvement of braking performance on dry road surfaces can be enhanced.

Further, a pneumatic tire of a ninth example is the tire according to any one of the first to eighth examples in which the land portion is disposed on the tire equatorial plane.

According to this pneumatic tire, the land portion on the tire equatorial plane is the land portion that is contacts the road surface the most, so by disposing the land portion that increases the braking performance on snow-covered road surfaces while maintaining the braking performance on dry road surfaces on the tire equatorial plane, these effects can be significantly obtained.

Also, the pneumatic tire of a tenth example is the tire according to any one of the first to ninth examples in which the groove width of the narrow grooves is formed in a range not less than 0.4 mm and not greater than 1.2 mm.

According to this pneumatic tire, each of the narrow grooves is configured as so-called sipe, so the edge effect is improved, and the effect of improvement of braking performance on snow-covered road surfaces can be enhanced.

With the pneumatic tire according to this technology, braking performance can be achieved on dry road surfaces, wet road surfaces, and snow-covered road surfaces.

BRIEF DESCRIPTION OF DRAWINGS

FIGS. 7A-7C include a table showing results of performance tests on pneumatic tires according to working examples of the present technology.

DETAILED DESCRIPTION

An embodiment of the present technology is described in detail below with reference to the drawings. However, the present technology is not limited by the embodiment. Furthermore, components of the embodiment include components that may be easily replaced by those skilled in the art or that are substantially identical to components of the embodiment. Furthermore, a plurality of modified examples described in the embodiment may be combined as desired within the scope apparent to those skilled in the art.

Figure 1:
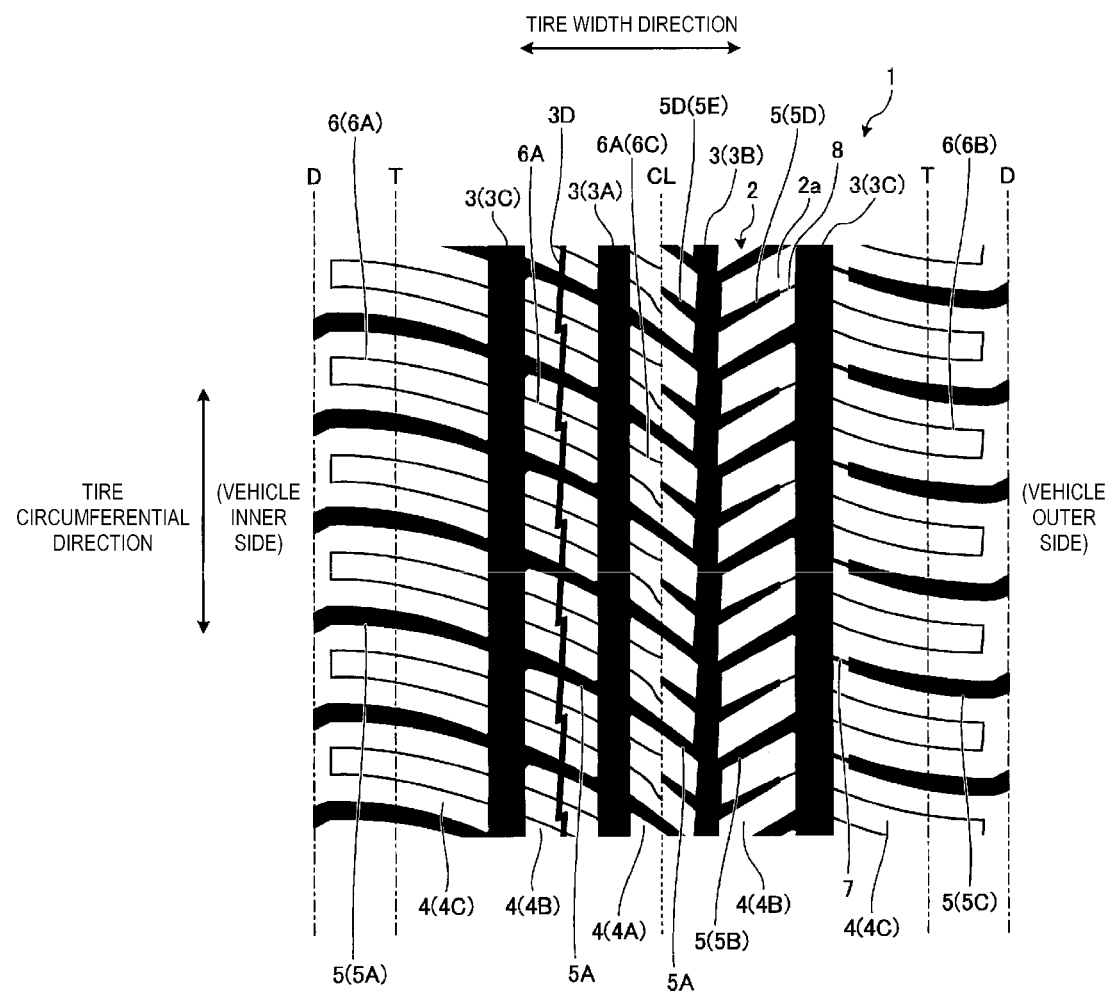
FIG. 1 is a plan view of a pneumatic tire according to an embodiment of the technology.

FIG. 1 is a plan view of a pneumatic tire according to the embodiment.

In the following description, "tire circumferential direction" refers to the circumferential direction with the rotational axis (not illustrated on the drawings) as the central axis. Additionally, "tire width direction" refers to a direction parallel to the rotational axis. "Inner side in the tire width direction" refers to a side towards a tire equatorial plane (tire equator) CL in the tire width direction, and "outer side in the tire width direction" refers to a side away from the tire equatorial plane CL in the tire width direction. Furthermore, the tire equatorial plane CL is orthogonal to the rotational axis of the pneumatic tire 1, and is a plane passing through the center of the pneumatic tire 1 in terms of tire width. The tire equator is a line that is on the tire equatorial plane CL and is along the circumferential direction of the pneumatic tire 1. In this embodiment, the tire equator and the tire equatorial plane share the reference sign CL.

The pneumatic tire 1 of this embodiment includes a tread portion 2, as illustrated in FIG. 1. The tread portion 2 is formed of a rubber material, and is exposed at an outermost side of the pneumatic tire 1 in the tire radial direction. The surface of the tread portion 2 is defined as a tread surface 2a that serves as a profile of the pneumatic tire 1. Also, the vehicle inner/outer side orientation of such a pneumatic tire 1 of this embodiment may be designated by indicators provided on the side wall portions, which indicate the vehicle inner/outer side orientation when the pneumatic tire 1 is mounted to a vehicle, for example. Note that the designations of the vehicle inner side and the vehicle outer side are not limited to cases when the tire 1 is mounted to the vehicle. For example, in cases when the tire 1 is assembled on a rim, orientation of the rim with respect to the inner side and the outer side of the vehicle in the tire width direction is predetermined. Therefore, in cases when the pneumatic tire 1 is assembled on a rim, the orientation with respect to the vehicle inner side and the vehicle outer side in the tire width direction is designated.

The tread portion 2 includes a plurality (four in this embodiment) of circumferential grooves 3 extending in the tire circumferential direction, being disposed side by side in the tire width direction on the tread surface 2a. Also, in this embodiment, two circumferential grooves 3 are provided on either side sandwiching the tire equatorial plane CL. Of these, of the two circumferential grooves 3 on either side of the tire equatorial plane CL, one is referred to as a first circumferential groove 3A, and the other is referred to as a second circumferential groove 3B. Also, the circumferential groove 3 on the vehicle inner side of the first circumferential groove 3A and on the vehicle outer side of the second circumferential groove 3B are referred to as third circumferential grooves 3C. Also, the second circumferential groove 3B is formed with a narrower groove width (groove opening width in the tire width direction) than the other circumferential grooves 3 (3A, 3C). Note that the circumferential grooves 3 have, for example, a groove width not less than 5 mm and not greater than 15 mm, and a groove depth (dimension from the opening position on the tread surface 2a to the groove bottom) not less than 5 mm and not greater than 15 mm.

A plurality of land portions 4 (five in this embodiment) is defined on the tread surface 2a of the tread portion 2 by the circumferential grooves 3. Also the land portion 4 on the tire equatorial plane CL between the first circumferential groove 3A and the second circumferential groove 3B is referred to as the center land portion 4A. Also, the land portion 4 on the vehicle inner side (outer side in the tire width direction) of the center land portion 4A between the first circumferential groove 3A and the vehicle inner side third circumferential groove 3C is referred to as the vehicle inner side middle land portion 4B. Also, the land portion 4 on the vehicle outer side (outer side in the tire width direction) of the center land portion 4A between the second circumferential groove 3B and the vehicle outer side third circumferential groove 3C is referred to as the vehicle outer side middle land portion 4B. Also, the land portion 4 on the vehicle innermost side (outer side in the tire width direction) of the vehicle inner side third circumferential groove 3C is referred to as the vehicle inner side shoulder land portion 4C. Also, the land portion 4 on the vehicle outermost side (outer side in the tire width direction) of the vehicle outer side third circumferential groove 3C is referred to as the vehicle outer side shoulder land portion 4C.

Also, a fourth circumferential groove 3D extending in a zigzag manner along the tire circumferential direction is formed in the tread surface 2a of the vehicle inner side middle land portion 4B. The fourth circumferential groove 3D has, for example, a groove width not less than 0.5 mm and not greater than the groove width of the other circumferential grooves 3A, 3B, 3C, and a groove depth not greater than the groove depths of the other circumferential grooves 3A, 3B, 3C.

In each land portion 4, a plurality of auxiliary grooves 5 and narrow grooves 6 are formed in the tread surface 2a intersecting the tire circumferential direction and arranged side by side in the tire circumferential direction. The narrow grooves 6 have, for example, a groove width of not less than 0.4 mm and not greater than 1.2 mm, and a groove depth not greater than that of the circumferential grooves 3. The auxiliary grooves 5 have, for example, a groove width of not less than 0.5 mm and not greater than those of the circumferential grooves 3 (excluding the fourth circumferential groove 3D), and a groove depth not greater than that of the circumferential grooves 3.

The auxiliary grooves 5 include first auxiliary grooves 5A, second auxiliary grooves 5B, third auxiliary grooves 5C, fourth auxiliary grooves 5D, and fifth auxiliary grooves 5E.

The first auxiliary grooves 5A are formed passing through the first circumferential groove 3A and communicating with the second circumferential groove 3B. More specifically, the first auxiliary grooves 5A are provided also passing through the vehicle inner side third circumferential groove 3C, and as a result passes from the vehicle inner side shoulder land portion 4C through the vehicle inner side middle land portion 4B and passes through the center land portion 4A. In other words, a first end of the first auxiliary grooves 5A is disposed at a design end D on the vehicle inner side of the ground contact edge T on the vehicle inner side shoulder land portion 4C, and a second end communicates with the second circumferential groove 3B. Also, the first auxiliary grooves 5A are formed with the groove width gradually increasing in the vehicle inner side direction away from the second circumferential groove 3B.

Here, the ground contact edges T are defined as two outermost edges of a ground contact region in the tire width direction. In FIG. 1, the ground contact edges T are depicted as continuous in the tire circumferential direction. The ground contact region is a region where the tread surface 2a of the tread portion 2 of the pneumatic tire 1 comes into contact with the road surface, with the pneumatic tire assembled on a regular rim, inflated to a regular inner pressure, and loaded with 70% of a regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). The "regular inner pressure" refers to "maximum air pressure" defined by JATMA, a maximum value given in "tire load limits at various cold inflation pressures" defined by TRA, or "inflation pressures" defined by ETRTO. Note that the "regular load" refers to "maximum load capacity" defined by JATMA, a maximum value given in "tire load limits at various cold inflation pressures" defined by TRA, or "load capacity" defined by ETRTO. Also, the design end D refers to the end in the outermost side of the tire width direction of the tread portion 2 where the auxiliary grooves 5 and the narrow grooves 6 are formed. In FIG. 1 the design end D is indicated as continuous in the tire circumferential direction.

The second auxiliary grooves 5B are formed communicating with the second circumferential groove 3B and are continuously formed bent with respect to the first auxiliary grooves 5A bounded by the second circumferential groove 3B. The first auxiliary grooves 5A and the second auxiliary grooves 5B are formed continuously bounded by the second circumferential groove 3B means that if the first auxiliary grooves 5A and the second auxiliary grooves 5B were extended within the second circumferential groove 3B, their extension lines would intersect within the second circumferential groove 3B. More specifically, the second auxiliary grooves 5B are disposed on the vehicle outer side of the second circumferential groove 3B and communicate with the third circumferential groove 3C, and are provided passing through the vehicle outer side middle land portion 4B. In other words, the ends of the second auxiliary grooves 5B communicate with the second circumferential groove 3B and the third circumferential groove 3C in the middle land portion 4B. Also, the second auxiliary grooves 5B are formed with the groove width gradually increasing in the vehicle outer side direction away from the second circumferential groove 3B.

In other words, the first auxiliary grooves 5A and the second auxiliary grooves 5B are formed continuously bounded by the second circumferential groove 3B, and are provided bent bounded by the second circumferential groove 3B. In FIG. 1, the first auxiliary grooves 5A and the second auxiliary grooves 5B are inclined with the opposite orientations with respect to the tire width direction, and are provided curved to the opposite side, and the two form a continuous V-shape with the apex at the second circumferential groove 3B. Note that, although not illustrated on the drawings, one of the first auxiliary grooves 5A and the second auxiliary grooves 5B may be formed along the tire width direction, and the other may be provided inclined with respect to the tire width direction.

The third auxiliary grooves 5C are formed in the vehicle outer side shoulder land portion 4C, with an end formed away from the third circumferential groove 3C on the vehicle outermost side. More specifically, a first end of the third auxiliary grooves 5C is disposed at the design end D on the vehicle outer side of the ground contact edge T on the vehicle outer side shoulder land portion 4C, and a second end terminates in the vehicle outer side shoulder land portion 4C away from the vehicle outer side third circumferential groove 3C. The third auxiliary grooves 5C are provided inclined in the same orientation with respect to the tire width direction as the first auxiliary grooves 5A, and curved to the opposite side. Note that the third auxiliary grooves 5C are formed away from the vehicle outer side third circumferential groove 3C, but a decorative groove 7 is interposed between the terminating second end portion and the third circumferential groove 3C. The decorative groove 7 is formed with a groove width and groove depth smaller than those of the third auxiliary grooves 5C.

The fourth auxiliary grooves 5D are provided in the center land portion 4A and the vehicle outer side middle land portion 4B, passing through the second circumferential groove 3B, with the two ends thereof terminating within the land portions 4A, 4B, and bent bounded by the second circumferential groove 3B. In other words, the fourth auxiliary grooves 5D include a first end side formed in the center land portion 4A and inclined in the same orientation with respect to the tire width direction as the first auxiliary grooves 5A, and a second end side formed in the vehicle outer side middle land portion 4B and inclined in the same direction with respect to the tire width direction as the second auxiliary grooves 5B and curved to the opposite side. Also, the fourth auxiliary grooves 5D are provided with the first end side and the second end side inclined with respect to the tire width direction in the opposite orientation, both being continuous and bounded by the second circumferential groove 3B forming a V-shape with the apex at the second circumferential groove 3B. Note that, although not illustrated on the drawings, one of the first auxiliary grooves 5A and the second auxiliary grooves 5B may be formed along the tire width direction, and the other may be provided inclined with respect to the tire width direction. Note that the fourth auxiliary grooves 5D are formed away from the vehicle outer side third circumferential groove 3C, but a decorative groove 8 is interposed between the terminating second end side and the third circumferential groove 3C. The decorative groove 8 is formed with a groove width and groove depth smaller than those of the fourth auxiliary grooves 5D.

The fifth auxiliary grooves 5E are auxiliary grooves that are a main part of this embodiment, and form the portions of the fourth auxiliary grooves 5D provided in the center land portion 4A. They are described in detail later.

Also, the narrow grooves 6 include a first narrow groove 6A, a second narrow groove 6B, and a third narrow groove 6C.

The first narrow groove 6A is provided between first auxiliary grooves 5A in the tire circumferential direction, extending from the vehicle inner side shoulder land portion 4C passing through the vehicle inner side middle land portion 4B to the center land portion 4A. The first narrow grooves 6A are inclined with respect to the tire width direction in the same orientation as the first auxiliary grooves 5A in the vehicle inner side shoulder land portion 4C and middle land portion 4B and is formed curved to the same side. The first narrow grooves 6A are arranged as sets of a plurality (two in this embodiment) that are linked at a first end portion at a position on the outer side in the width direction of the ground contact edge T in the vehicle inner side shoulder land portion 4C, and each of the second end portions terminate in the center land portion 4A.

The second narrow grooves 6B are provided between the third auxiliary grooves 5C in the tire circumferential direction, and are provided in the vehicle outer side shoulder land portion 4C. The second narrow grooves 6B are provided inclined in the same orientation with respect to the tire width direction as the third auxiliary grooves 5C, and curved to the same side. The second narrow grooves 6B are arranged as sets of a plurality (two in this embodiment) that communicate with the vehicle outer side third circumferential grooves 3C at a first end portion, and are linked together at a second end portion at a position to the outer side in the tire width direction of the ground contact edge T.

The third narrow grooves 6C are auxiliary grooves that are a main part of this embodiment, and form the portion of the first narrow grooves 6A provided in the center land portion 4A side. They are described in detail later.

FIGS. 2 to 5 are enlarged plan views of a portion of the pneumatic tire according to this embodiment, illustrating an enlarged plan view in the vicinity of the center land portion 4A.

Figure 2:
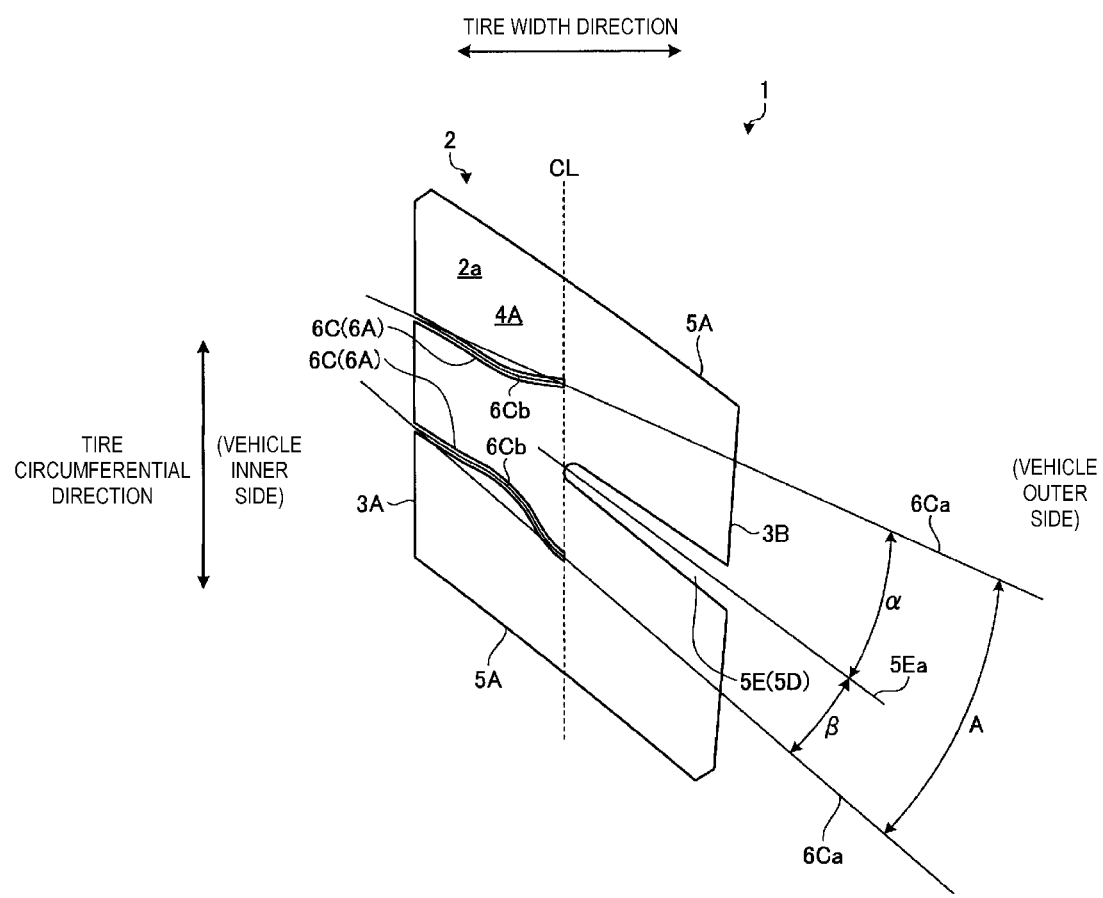
FIG. 2 is a partial enlarged plan view of the pneumatic tire according to the embodiment of the present technology.

As illustrated in FIG. 2, the center land portion 4A is formed in a block shape by the first circumferential groove 3A, the second circumferential groove 3B, and the first auxiliary grooves 5A. Note that the center land portion 4A may be formed in a rib shape by the first circumferential groove 3A and the second circumferential groove 3B, with the first auxiliary grooves 5A terminating without passing through. The third narrow grooves 6C that are narrow grooves that are a main part of this embodiment and the fifth auxiliary grooves 5E that serve as auxiliary grooves are formed on the tread surface 2a in the center land portion 4A.

As illustrated in FIG. 2, the third narrow groove 6C is provided intersecting the tire circumferential direction, with a first end portion communicating with the first circumferential groove 3A, and a second end portion terminating within the center land portion 4A. The third narrow groove 6C is formed as one set of two grooves arranged in the tire circumferential direction.

Also, the set of the third narrow groove 6C is formed with an angle A extending from the first end portion that communicates with the first circumferential groove 3A towards the second end portion that terminates within the center land portion 4A within a range not less than 10° and not greater than 50°. Here, as illustrated in FIG. 2, the third narrow groove 6C is formed curved. In such a third narrow groove 6C, the straight lines 6Ca that connect the center of the groove width of the first end portion that communicates with the first circumferential groove 3A and the center of the groove width of the second end portion that terminates within the center land portion 4A is taken to be the extension direction. Therefore, as illustrated in FIG. 2, the angle A between the set of the third narrow groove 6C is specified to be the angle between the straight lines 6Ca that indicate their directions of extension.

Also, the third narrow groove 6C is formed based on two or more continuous different straight lines or curves. In other words, although not illustrated on the drawings, the third narrow groove 6C includes cases in which two or more continuous different straight lines extend bent in a zigzag manner, and cases in which two or more different curves extend bent in a wavy manner. In these cases also, the straight lines 6Ca that connect the center of the groove width of the first end portion that communicates with the first circumferential groove 3A and the center of the groove width of the second end portion that terminates within the center land portion 4A is taken to be the extension direction. Note that in FIG. 2, the center line 6Cb is illustrated connecting the center of the groove width of the third narrow groove 6C in the extension direction. The center line 6Cb is a reference line representing the curved shape or the bent shape of the extension direction of the third narrow groove 6C. Also, the sets of the third narrow grooves 6C may be formed so that they become closer in the extension direction from the first end portion that communicates with the first circumferential groove 3A towards the second end portion that terminates within the center land portion 4A, or they may be formed parallel.

Figure 3:
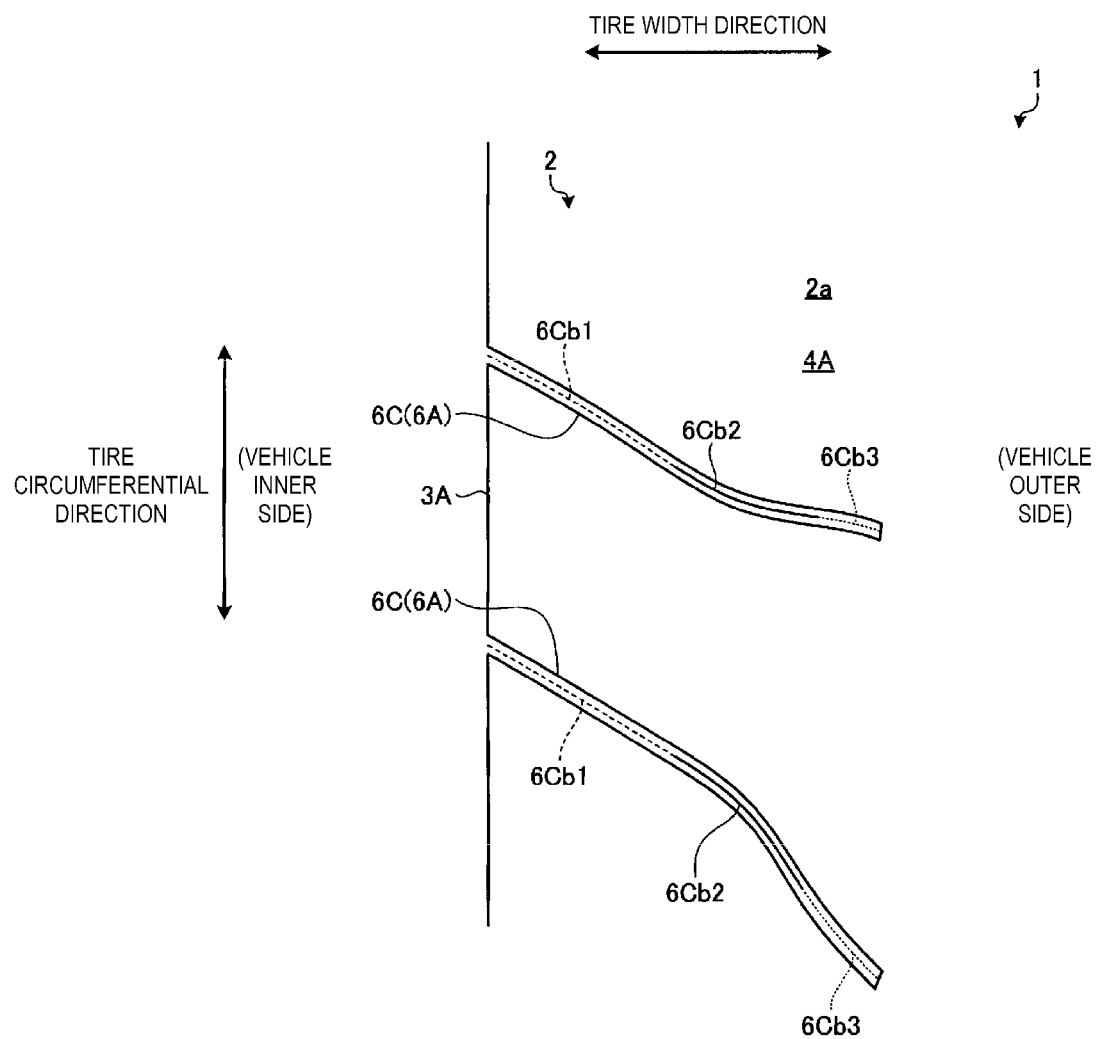
FIG. 3 is a partial enlarged plan view of a pneumatic tire according to the embodiment of the technology.

As illustrated in FIG. 3, in this embodiment the third narrow grooves 6C are formed of three reference lines smoothly connected that extend from the first end portion that communicates with the first circumferential groove 3A to the second end portion that terminates within the center land portion 4A: a first reference line 6Cb1 (indicated with a long broken line), a second reference line 6Cb2 (indicated with a solid line), and a third reference line 6Cb3 (represented by a short broken line) in that order.

Figure 4:
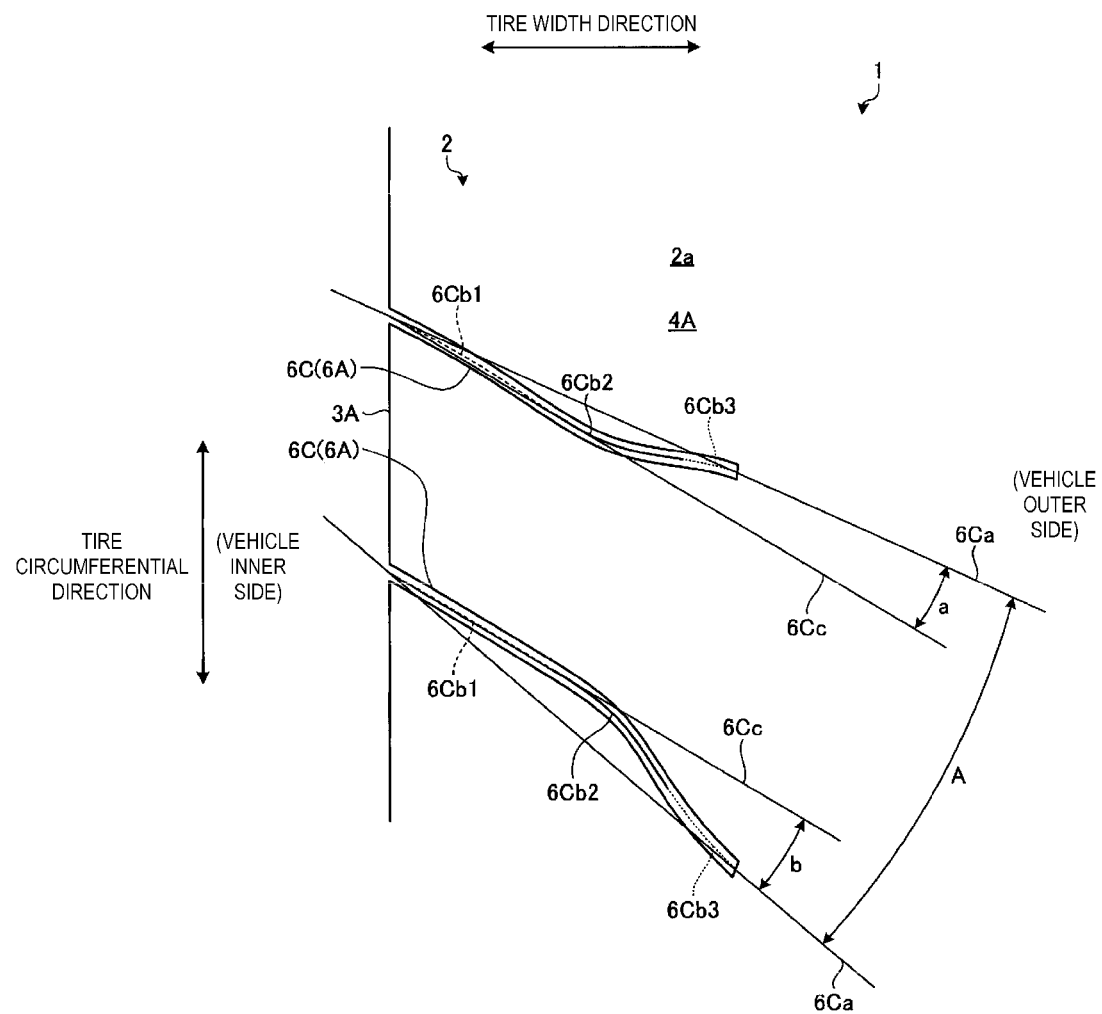
FIG. 4 is a partial enlarged plan view of a pneumatic tire according to the embodiment of the technology.

Also, as illustrated in FIG. 4, in a set of the third narrow grooves 6C, the first reference lines 6Cb1 that extend from the first end portion that communicates with the first circumferential groove 3A extend curved towards the inner side with respect to the straight lines 6Ca that connect the first end portion that communicates with the first circumferential groove 3A and the second end portion that terminates within the center land portion 4A. The straight line 6Cc that connects both ends of the first reference line 6Cb1 is taken to be the extension direction of the first reference line 6Cb 1. The angles a, b formed between the straight line 6Cc, which is the extension direction of the first reference line 6Cb1 and the straight line 6Ca are formed within a range not greater than 5° and not less than 20°.

Figure 5:
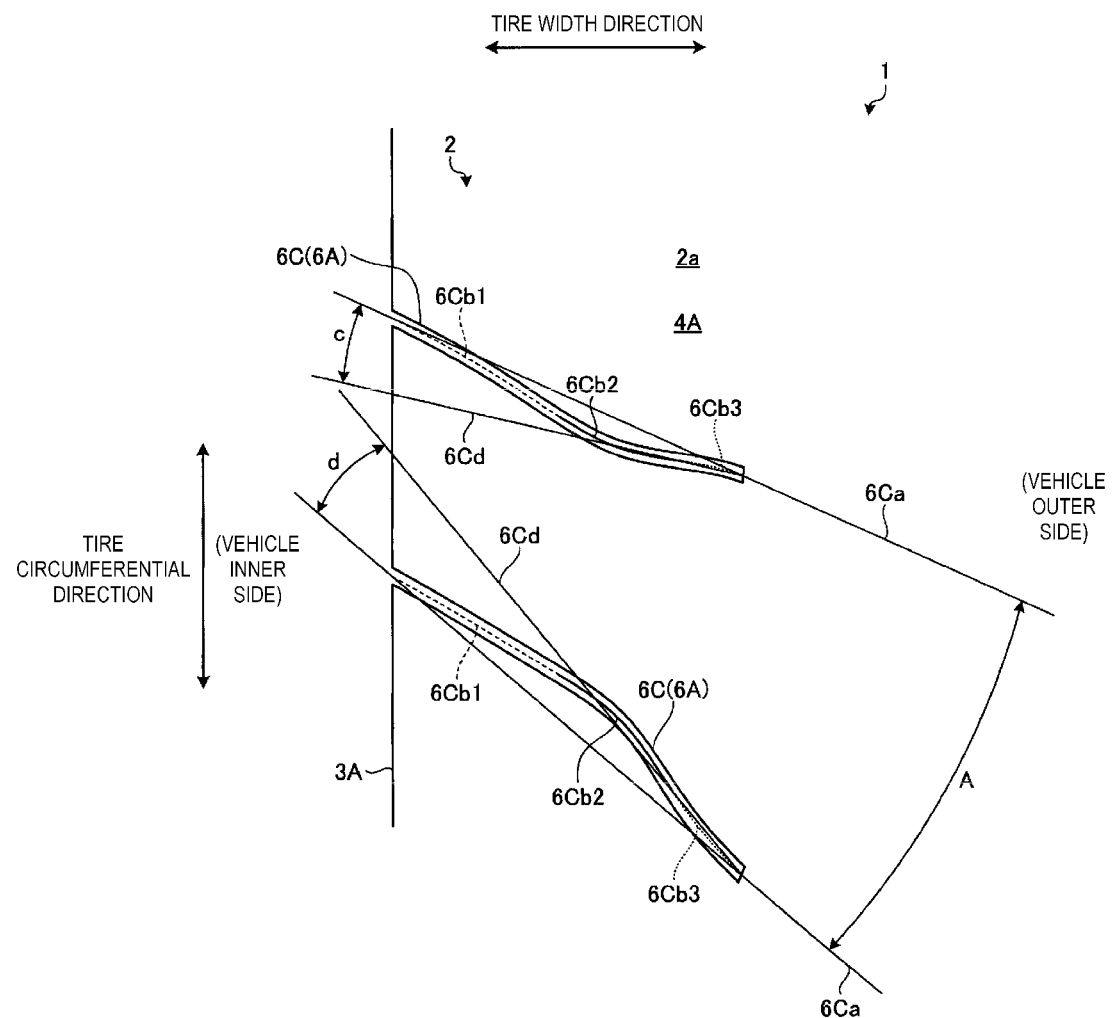
FIG. 5 is a partial enlarged plan view of a pneumatic tire according to the embodiment of the technology.

Also, as illustrated in FIG. 5, in a set of the third narrow grooves 6C, the third reference line 6Cb3 that extends from the second end portion that terminates within the center land portion 4A extends curved towards the inner side with respect to the straight lines 6Ca that connect the first end portion that communicates with the first circumferential groove 3A with the second end portion that terminates within the center land portion 4A. The straight line 6Cd that connects both ends of the third reference line 6Cb3 is taken to be the extension direction of the third reference line 6Cb3. The angles c, d formed between the straight lines 6Cd, which is the extension direction of the third reference line 6Cb3, and the straight lines 6Ca are formed within a range not greater than 5° and not less than 20°.

Note that, as illustrated in FIGS. 3 to 5, in the third narrow grooves 6C, the second reference line 6Cb2 is provided smoothly and continuously between the first reference line 6Cb1 and the third reference line 6Cb3. Note that in this embodiment, the second reference line 6Cb2 is indicated as curved, but it may be a straight line.

Returning to FIG. 2, the auxiliary grooves 5E are formed intersecting the tire circumferential direction, with the first end portion thereof communicating with the second circumferential groove 3B, and terminating at the second end thereof within the center land portion 4A. The second end portion at which the fifth auxiliary groove 5E terminates is arranged between the second end portions at which the set of third narrow grooves 6C terminates in the tire circumferential direction. Also, the fifth auxiliary grooves 5E are formed with the groove width gradually decreasing from the first end portion that communicates with the second circumferential groove 3B towards the second end portion that terminates within the center land portion 4A.

Note that the form illustrated in FIG. 2 is a form in which the second end portion at which the fifth auxiliary groove 5E terminates is arranged between the second end portions at which the set of the third narrow grooves 6C terminates in the tire circumferential direction, and are arranged on the tire equatorial plane CL, but this is not a limitation. For example, although not illustrated on the drawings, a form in which at least one of the terminating ends passes over the tire equatorial plane CL, or does not pass over the tire equatorial plane CL may be used.

An angle α between the extension direction of the fifth auxiliary groove 5E that extends from the first end portion that communicates with the second circumferential groove 3B towards the second end portion that terminates within the second land portion 4A and the extension direction of a first of the set of third narrow grooves 6C is formed in a range not less than 10° and not greater than 30°. Also, an angle β between the extension direction of the fifth auxiliary groove 5E that extends from the first end portion that communicates with the second circumferential groove 3B towards the second end portion that terminates within the second land portion 4A and the extension direction of a second of the set of third narrow grooves 6C is formed in a range not less than 1° and not greater than 20°. Also, the sum of the angle α and the angle β is formed in the range of the angle A as described above. Here, as illustrated in FIG. 2, the extension direction of the auxiliary grooves 5E is taken to be a straight line 5Ea that connects the center of the groove width at the first end portion that communicates with the second circumferential groove 3B and the center of the groove width at the second end portion that terminates within the center land portion 4A. Therefore, as illustrated in FIG. 2, the angle α formed between the extension direction of the fifth auxiliary groove 5E and the extension direction of the first of the set of the third narrow grooves 6C is specified to be the angle formed between the straight line 5Ea and the straight line 6Ca of the first of the third narrow grooves 6C. Also, as illustrated in FIG. 2, the angle β formed between the extension direction of the fifth auxiliary groove 5E and the extension direction of the second of the set of the third narrow grooves 6C is specified to be the angle formed between the straight line 5Ea and the straight line 6Ca of the second of the third narrow grooves 6C.

Note that in this embodiment, the third narrow grooves 6C and the fifth auxiliary groove 5E are configured to be provided in the center land portion 4A, but they may be provided in another land portion (for example, the middle land portion 4B). Also, in this embodiment, there are four circumferential grooves, but there may be at least two circumferential grooves that define the land portion in which the third narrow grooves 6C and the fifth auxiliary grooves 5E are provided. Also, the arrangement of the third narrow grooves 6C and the fifth auxiliary grooves 5E is not limited to the vehicle inner side or the vehicle outer side.

Figure 6:
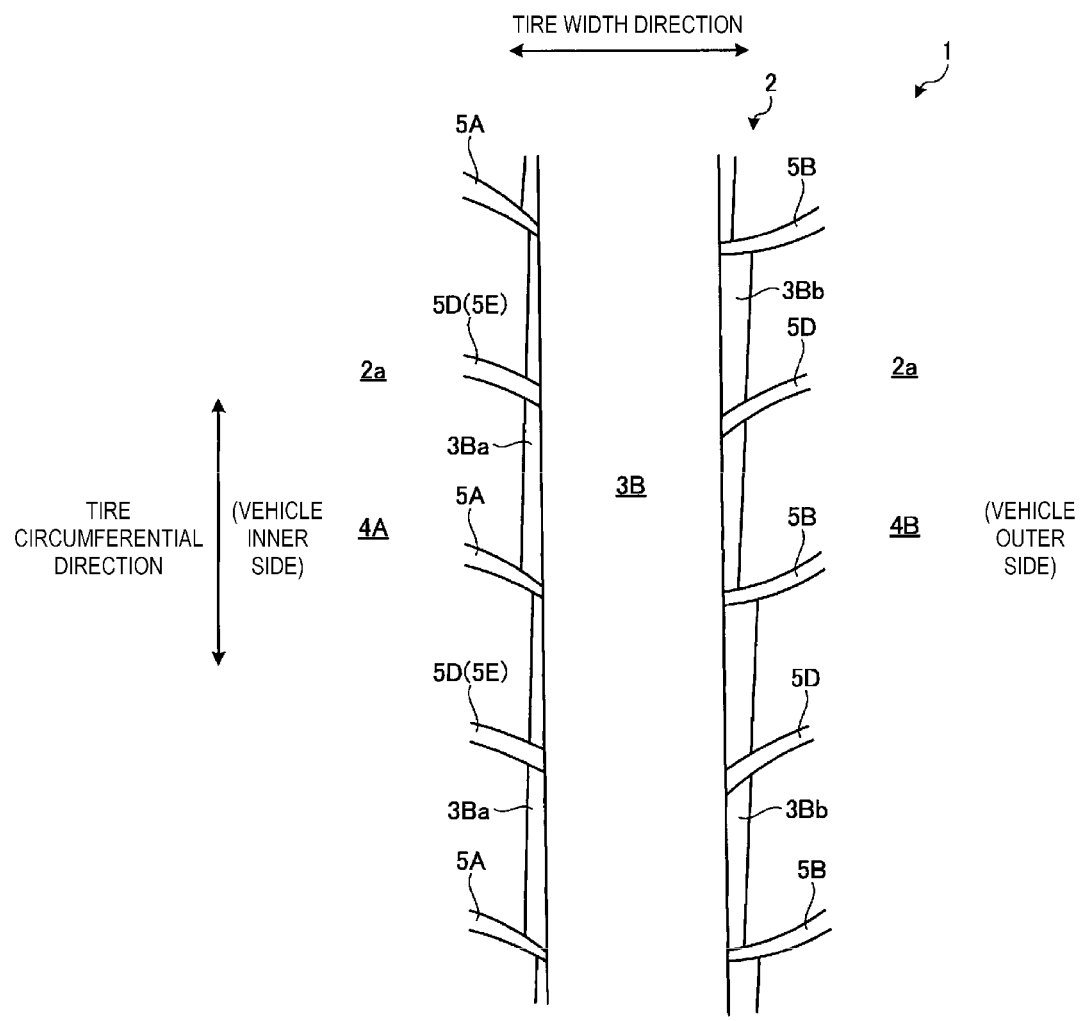
FIG. 6 is a partial enlarged plan view of a pneumatic tire according to the embodiment of the technology.

FIG. 6 is an enlarged plan view of a portion of the pneumatic tire according to the present embodiment, illustrating an enlarged plan view in the vicinity of the second circumferential groove 3B.

As illustrated in FIG. 6, in the pneumatic tire of this embodiment, chamfers 3Ba, 3Bb are provided on the opening edges on both sides in the tire width direction in the second circumferential groove 3B. The chamfer 3Ba is provided on the opening edge of the second circumferential groove 3B on the center land portion 4A side, and is formed in an approximate triangular shape with the width of the chamfer gradually changing between the first auxiliary grooves 5A. Also, the chamfer 3Bb is provided on the opening edge of the second circumferential groove 3B on the vehicle outer side middle land portion 4B side, and is formed in an approximate triangular shape with the width of the chamfer gradually changing in the tire circumferential direction between the second auxiliary grooves 5B. Also, the chamfers 3Ba, 3Bb are arranged with the approximate triangular shapes in which the chamfer widths are gradually changed inverted on the opening edges on both sides of the second circumferential groove 3B. Note that on the center land portion 4A side, the fourth auxiliary groove 5D (fifth auxiliary groove 5E) passes through the chamfer 3Ba part way and communicates with the second circumferential groove 3B. Also, on the vehicle outer side middle land portion 4B side, the fourth auxiliary groove 5D passes through the chamfer 3Bb part way and communicates with the second circumferential groove 3B. Note that, although not illustrated on the drawings, the chamfer widths of the chamfers 3Ba, 3Bb may be formed parallel to the tire circumferential direction.

As described above, the pneumatic tire 1 of this embodiment includes in the land portion (center land portion 4A) defined by the first circumferential groove 3A and the second circumferential groove 3B, narrow grooves (third narrow grooves 6C) formed as sets of two grooves provided intersecting the tire circumferential direction and arranged side by side in the tire circumferential direction communicating with the first circumferential groove 3A and terminating in the center land portion 4A; and auxiliary grooves (fifth auxiliary grooves 5E) provided intersecting the tire circumferential direction communicating with the second circumferential groove 3B and terminating within the center land portion 4A with the positions of the terminating end portions thereof disposed between the terminating end portions of the set of the third narrow grooves 6C in the tire circumferential direction.

According to this pneumatic tire 1, the auxiliary grooves (fifth auxiliary grooves 5E) improve the water drainage properties, so the braking performance on wet road surfaces can be improved. Moreover, the edge effect is improved by the narrow grooves (third narrow grooves 6C), so the braking performance on snow-covered road surfaces can be improved. Moreover, the third narrow grooves 6C and the fifth auxiliary grooves 5E terminate within the land portion (center land portion 4A), and the position of the terminating end of the fifth auxiliary groove 5E is arranged between the end portions of the set of third narrow grooves 6C in the tire circumferential direction. Therefore the stiffness of the land portion is improved, and the braking performance on dry road surfaces can be improved.

Also, in the pneumatic tire 1 of this embodiment, the second circumferential groove 3B is formed with a narrower groove width than that of the first circumferential groove 3A, and the third narrow grooves 6C are formed with a narrower groove width than that of the fifth auxiliary grooves 5E.

According to the pneumatic tire 1, by making the groove width of the second circumferential groove 3B narrower, the stiffness of the land portions on both sides (the center land portion 4A and the vehicle outer side middle land portion 4B) can be increased, but the water drainage properties tend to be reduced. This reduction in water drainage properties can be compensated for by the fifth auxiliary groove 5E which has a wide groove width. Also, the third narrow grooves 6C, which communicate with the first circumferential groove 3A that has a wide groove width, are formed with a narrower groove width than the fifth auxiliary grooves 5E, so stiffness balance is provided in the land portion (center land portion 4A) between the first circumferential groove 3A and the second circumferential groove 3B, and uneven wear can be reduced.

Also, in the pneumatic tire 1 of this embodiment, one set of two third narrow grooves 6C is formed spreading from the communicating end portion extending towards the terminating end portion with the angle A in the range not less than 10° and not greater than 50°. Also the fifth auxiliary groove 5E extends from the terminating end portion towards the communicating end portion with the angle α with respect to the first of the set of two third narrow grooves 6C in the range not less than 9° and not greater than 30°, and the angle β with respect to the second formed in the range not less than 1° and not greater than 20°.

According to the pneumatic tire 1, the set of two third narrow grooves 6C is formed spreading as it extends away from the fifth auxiliary groove 5E, so the reduction in stiffness of the land portion is suppressed, and the effect of improvement of braking performance on snow-covered road surfaces can be enhanced by the edge effect of the third narrow groove 6C.

Here, when the angle opened between the two grooves of the set of third narrow grooves 6C is less than 10°, the third narrow grooves 6C approach parallel, so it is difficult to suppress the reduction in land portion stiffness. On the other hand, when the angle opened between the two grooves of the set of third narrow grooves 6C exceeds 50°, they approach the tire circumferential direction, so it is difficult to obtain the edge effect. Therefore, preferably the set of two third narrow grooves 6C is formed spreading as it extends from the communicating end towards the terminating end with the angle A in the range not less than 10° and not greater than 50°. Also if the angle α between the fifth auxiliary groove 5E and the first of the third narrow grooves 6C is less than 9°, the fifth auxiliary groove 5E and the first of the third narrow grooves 6C approach parallel, so it is difficult to suppress the reduction in land portion stiffness. On the other hand, if the angle α between the fifth auxiliary groove 5E and the first of the third narrow grooves 6C exceeds 30°, the angle β between the fifth auxiliary groove 5E and the second of the third narrow grooves 6C approaches parallel, so it is difficult to suppress the reduction in land portion stiffness. Also if the angle β between the fifth auxiliary groove 5E and the second of the third narrow grooves 6C is less than 1°, the fifth auxiliary groove 5E and the second of the third narrow grooves 6C approach parallel, so it is difficult to suppress the reduction in land portion stiffness. On the other hand, if the angle β between the fifth auxiliary groove 5E and the second of the third narrow grooves 6C exceeds 20°, the angle α between the fifth auxiliary groove 5E and the first of the third narrow grooves 6C approaches parallel, so it is difficult to suppress the reduction in land portion stiffness. Therefore preferably the fifth auxiliary groove 5E extends from the terminating end towards the communicating end with the angle α with respect to the first of the set of two third narrow grooves 6C in the range not less than 9° and not greater than 30°, and the angle β with respect to the second formed in the range not less than 1° and not greater than 20°.

Also, in the pneumatic tire 1 of this embodiment, the third narrow groove 6C is formed based on two or more continuous different straight lines or curves.

According to the pneumatic tire 1, by forming the third narrow groove 6C based on two or more continuous different straight lines or curves, the edge effect produced by the third narrow groove 6C is improved, so the effect of improvement of braking performance on snow-covered road surfaces can be enhanced.

Also, in the pneumatic tire 1 of this embodiment, the third narrow groove 6C is formed smoothly and continuously of three reference lines: the first reference line 6Cb1, the second reference line 6Cb2, and the third reference line 6Cb3 in this order from the communicating end towards the terminating end.

According to this pneumatic tire 1, by forming the third narrow groove 6C smoothly and continuously of the first reference line 6Cb1, the second reference line 6Cb2, and the third reference line 6Cb3, collapse of the land portion (center land portion 4A) can be reduced, and the effect of improvement of braking performance on dry road surfaces can be enhanced. Moreover, by forming the third narrow groove 6C smoothly and continuously of the reference lines 6Cb1, 6Cb2, 6Cb3, the strength of the third narrow groove 6C itself is increased, so the grip properties are good, and the effect of improving the braking performance on dry road surfaces can be enhanced.

Also, in the pneumatic tire 1 of this embodiment, in the set of first narrow grooves 6C, each of the first reference lines 6Cb1 that extend from the communicating end portions extend towards the inner side with respect to the straight lines 6Ca that connect the communicating end portions and the terminating end portions, and the first reference lines 6Cb1 and the and the straight lines 6Ca form an angle in the range not less than 5° and not greater than 20°.

If the angle of the first reference lines 6Cb1, that extend from the communicating end portions with respect to the straight lines 6Ca that connect the communicating end portions and the terminating end portions, in other words with respect to the overall extension direction of the third narrow grooves 6C, is less than 5°, the third narrow grooves 6C approach a straight line, so it is difficult to obtain the effect of reducing the collapse of the land portion (center land portion 4A). On the other hand, when the angle between the first reference line 6Cb1 and the straight line 6Ca exceeds 20°, the third narrow groove 6C deviates greatly from its overall extension direction, so it is difficult to obtain the effects of increasing the strength of the third narrow groove 6C itself and good grip properties. Therefore, by forming the angle between the third narrow groove 6C and the first reference line 6Cb1 in the range not less than 5° and not greater than 20°, the effects of reduction in collapse of the land portion (center land portion 4A) and improvement in braking performance on dry road surfaces can be further enhanced, the strength of the third narrow groove 6C itself can be increased, and the effect of improvement in the braking performance on dry road surfaces can be further enhanced.

Also, in the pneumatic tire 1 of this embodiment, in the set of first narrow grooves 6C, each of the third reference lines 6Cb3 that extend from the terminating end portions extend towards the inner side with respect to the straight lines 6Ca that connect the communicating end portions and the terminating end portions, and the third reference lines 6Cb3 and the straight lines 6Ca form an angle in the range not less than 5° and not greater than 20°.

If the angle of the third reference lines 6Cb3, that extend from the terminating end portions with respect to the straight lines 6Ca that connect the communicating end portions and the terminating end portions, in other words with respect to the overall extension direction of the third narrow grooves 6C, is less than 5°, the third narrow grooves 6C approach a straight line, so it is difficult to obtain the effect of reducing the collapse of the land portion (center land portion 4A). On the other hand, when the angle between the third reference line 6Cb3 and the straight line 6Ca exceeds 20°, the third narrow groove 6C deviates greatly from its overall extension direction, so it is difficult to obtain the effects of increasing the strength of the third narrow groove 6C itself and good grip properties. Therefore, by forming the angle between the third narrow groove 6C and the third reference line 6Cb3 in the range not less than 5° and not greater than 20°, the effects of reduction in collapse of the land portion (center land portion 4A) and improvement in braking performance on dry road surfaces can be further enhanced, the strength of the third narrow groove 6C itself can be increased, and the effect of improvement in the braking performance on dry road surfaces can be further enhanced.

Also, in the pneumatic tire 1 of this embodiment, the fifth auxiliary groove 5E is formed with the groove width gradually decreasing from the communicating end portion towards the terminating end portion.

According to this pneumatic tire 1, by forming the fifth auxiliary groove 5E so that the tip becomes narrower within the land portion (center land portion 4A), the ground contact area of the land portion can be ensured, and the effect of improvement of braking performance on dry road surfaces can be enhanced.

Also, in the pneumatic tire 1 of this embodiment, the land portion in which the third narrow grooves 6C and the fifth auxiliary grooves 5E are provided is the center land portion 4A which is disposed on the tire equatorial plane CL.

According to the pneumatic tire 1, the center land portion 4A is the land portion that contacts the road surface the most, so by disposing the land portion that increases the braking performance on snow-covered road surfaces while maintaining the braking performance on dry road surfaces on the tire equatorial plane CL, these effects can be significantly obtained.

Additionally, with the pneumatic tire 1 of this embodiment, the groove width of each narrow groove 6A, 6B, 6C is formed so as to be in the range not less than 0.4 mm and not greater than 1.2 mm.

According to the pneumatic tire 1, by configuring each of the narrow grooves 6A, 6B, 6C as so-called sipe, the edge effect is improved, so the effect of improvement of braking performance on snow-covered road surfaces can be enhanced.

Note that the pneumatic tire of this embodiment includes the first circumferential groove 3A and the second circumferential groove 3B on the tread surface 2a of the tread portion 2, extending along the tire circumferential direction and sandwiching the tire equatorial plane CL and arranged side by side in the tire width direction; a plurality of the first auxiliary grooves 5A formed intersecting the tire circumferential direction passing through the first circumferential groove 3A and communicating with the second circumferential groove 3B; and a plurality of second auxiliary grooves 5B provided intersecting the tire circumferential direction and inclined with respect to the tire width direction, communicating with the second circumferential groove 3B and bent continuously with respect to the first auxiliary groove 5A bounded at the second circumferential direction 3B.

According to this pneumatic tire 1, by bending the first auxiliary grooves 5A and the second auxiliary grooves 5B that communicate with the second circumferential groove 3B bounded at the second circumferential groove 3B, at least one of the auxiliary grooves will be inclined with respect to the tire width direction, so the stiffness of the defined land portion is improved. Moreover, by continuously bending the first auxiliary grooves 5A and the second auxiliary grooves 5B that communicate with the second circumferential groove 3B bounded at the second circumferential groove 3B, the water drainage properties in the tire width direction are improved. Moreover, the first auxiliary groove 5A passes through the second circumferential groove 3B as well as the first circumferential groove 3A, so the land portion between the first circumferential groove 3A and the second circumferential groove 3B is formed in a block-like manner, so the edge effect is improved. As a result, the braking performance on dry road surfaces is improved by the increase in stiffness of the land portion, the braking performance on wet road surfaces is improved by the improvement in water drainage properties, and the braking performance on snow-covered road surfaces is improved by the edge effect.

Note that by forming the first auxiliary groove 5A curved, the edge effect is further improved, so the effect of improvement of braking performance on snow-covered road surfaces can be enhanced.

Also, with the pneumatic tire 1 of this embodiment, the orientation of the vehicle inner side and the vehicle outer side when mounted on a vehicle is specified, the first circumferential groove 3A is disposed on the vehicle inner side, the second circumferential groove 3B is disposed on the vehicle outer side, and the third circumferential grooves 3C are further provided on the vehicle inner side of the first circumferential groove 3A and on the vehicle outer side of the second circumferential groove 3B, extending along the tire circumferential direction. The circumferential grooves 3A, 3B, 3C define the center land portion 4A on the tire equatorial plane CL, the middle land portions 4B on the two outer sides in the tire width direction of the center land portion 4A, and the outer side shoulder land portions 4C in the tire width direction of the middle land portions 4B. The groove width of the second circumferential groove 3B is formed narrower than those of the other circumferential grooves 3A, 3B. Also the first auxiliary groove 5A passes through the third circumferential groove 3C that is disposed on the vehicle inner side of the first circumferential groove, so it is provided passing through the vehicle inner side shoulder land portion 4C, the vehicle inner side middle land portion 4B, and the center land portion 4A. The second auxiliary groove 5B communicates with the third circumferential groove 3C that is disposed on the vehicle outer side of the second circumferential groove 3B, so it is provided passing through the vehicle outer side middle land portion 4B.

According to this pneumatic tire 1, the second circumferential groove 3B is disposed on the vehicle outer side of the center land portion 4A that is on the tire equatorial plane CL, and is formed with a narrower groove width than those of the other circumferential grooves 3A, 3C. Therefore the dimensions in the tire width direction of the vehicle outer side middle land portion 4B and shoulder land portion 4C that contribute to the braking performance on dry road surfaces are increased compared with the vehicle inner side, so the land portion stiffness is improved. Moreover, on the vehicle inner side that contributes to the braking performance on wet road surfaces and snow-covered road surfaces, the first auxiliary groove 5A passes through the shoulder land portion 4C, the middle land portion 4B, and the center land portion 4A, so the water drainage properties are improved, and the land portion of the vehicle inner side is formed in a block-like manner, so the edge effect is improved. As a result, the effect of improving the braking performance on dry road surfaces, wet road surfaces, and snow-covered road surfaces can be enhanced.

Also, in the pneumatic tire 1 of this embodiment, the first narrow groove 6A is further provided extending from the vehicle inner side shoulder land portion 4C passing through the vehicle inner side middle land portion 4B to the center land portion 4A, formed with a groove width narrower than that of the first auxiliary groove 5A.

According to this pneumatic tire 1, by providing the first narrow grooves 6A, the edge effect is improved, so the effect of improvement of braking performance on snow-covered road surfaces can be enhanced.

Note that by forming the first narrow groove 6A curved, the edge effect is further improved, so the effect of improvement of braking performance on snow-covered road surfaces can be enhanced.

Also, in the pneumatic tire 1 of this embodiment, the first narrow grooves 6A are arranged as sets of a plurality of grooves arranged side by side in the tire circumferential direction that are linked at the first end portion in the vehicle inner side shoulder land portion 4C, and each of the second end portions is provided terminating in the center land portion 4A.

According to this pneumatic tire 1, the edge effect is further improved, so the effect of improvement of braking performance on snow-covered road surfaces can be enhanced. Moreover, by disposing a plurality of grooves arranged as a set in the tire circumferential direction with the first end portion of each linked in the vehicle inner side shoulder land portion 4C, the water drainage properties are improved, so the effect of improvement of braking performance on wet road surfaces can be enhanced.

Also, in the pneumatic tire 1 of this embodiment, the fourth circumferential groove 3D is further provided in the vehicle inner side middle land portion 4B extending along the tire circumferential direction in a zigzag manner and formed with a narrower groove width than those of the other circumferential grooves 3A, 3B, 3C.

According to this pneumatic tire 1, collapse in the tire width direction is prevented in the vehicle inner side middle land portion 4B by the zigzag shape, so the stiffness of the middle land portion 4B is improved, and the effect of improving the braking performance on dry road surfaces can be enhanced. Moreover, the edge effect is improved by the zigzag shape, so the effect of improving the braking performance on snow-covered road surfaces can be enhanced.

Also, in the pneumatic tire 1 of this embodiment, the plurality of the third auxiliary grooves 5C is further provided in the vehicle outer side shoulder land portion 4C, intersecting the tire circumferential direction, and arranged side by side in the tire circumferential direction, with an end portion that is separated from the vehicle outer side third circumferential groove 3C.

According to this pneumatic tire 1, the effect of improvement of braking performance on snow-covered road surfaces can be enhanced by the edge effect of the third auxiliary groove 5C. Moreover, by forming the end portion of the third auxiliary groove 5C away from the vehicle outer side third circumferential groove 3C, the stiffness of the vehicle outer side shoulder land portion 4C is improved, so the effect of improving the braking performance on dry road surfaces can be enhanced.

Also, in the pneumatic tire 1 of this embodiment, the plurality of fourth auxiliary grooves 5D is further provided in the center land portion 4A and the vehicle outer side middle land portion 4B, intersecting the tire circumferential direction and arranged side by side in the tire circumferential direction, passing through the second circumferential groove 3B with the two end portions terminating in the land portions 4A, 4B, and provided bent bounded by the second circumferential groove 3B.

According to this pneumatic tire 1, by terminating the end portions of the fourth auxiliary grooves 5D in the land portions 4A, 4B, the stiffness of the land portions 4A, 4B is improved, and the effect of improvement of braking performance on dry road surfaces can be enhanced. Moreover, by bending the fourth auxiliary grooves 5D bounded at the second circumferential groove 3B, the water drainage properties in the tire width direction are improved, so the effect of improvement of braking performance on wet road surfaces can be enhanced. Moreover, by bending the fourth auxiliary grooves 5D bounded at the second circumferential groove 3B, the edge effect is improved, so the effect of improvement of braking performance on snow-covered road surface can be enhanced.

Also, in the pneumatic tire 1 of this embodiment, the plurality of the second narrow grooves 6B is further provided in the vehicle outer side shoulder land portion 4C, intersecting the tire circumferential direction, and arranged in the tire circumferential direction as a set, the first end portions thereof communicating with the vehicle outer side third circumferential groove 3C and the second end portions thereof linked.

According to this pneumatic tire 1, by providing the second narrow grooves 6B, the edge effect is improved, so the effect of improvement of braking performance on snow-covered road surfaces can be enhanced. Moreover, by disposing a plurality of grooves as one set arranged side by side in the tire circumferential direction, the edge effect is further increased, so the effect of improvement of braking performance on snow-covered road surfaces can be enhanced. Moreover, by disposing a plurality of grooves as one set arranged side by side in the tire circumferential direction with the second end portion of each linked in the vehicle outer side shoulder land portion 4C, the water drainage properties are improved, so the effect of improvement of braking performance on wet road surfaces can be enhanced.

Note that by forming the second narrow groove 6B curved, the edge effect is further improved, so the effect of improvement of braking performance on snow-covered road surfaces can be enhanced.

Also, in the pneumatic tire 1 of this embodiment, the first auxiliary grooves 5A are formed with the groove width gradually increasing with distance away from the second auxiliary grooves 5B, and the second auxiliary grooves 5B are formed with the groove width gradually increasing with distance away from the first auxiliary grooves 5A.

According to this pneumatic tire 1, the water drainage properties are improved, so the braking performance on wet road surfaces can be enhanced.

Also, in the pneumatic tire 1 of this embodiment, the chamfers 3Ba, 3Bb are provided on the opening edges on both sides in the tire width direction in the second circumferential groove 3B.

According to this pneumatic tire 1, the edge effect is improved by the chamfers 3Ba, 3Bb, so the effect of improvement of braking performance on snow-covered road surfaces can be enhanced.

Also, in the pneumatic tire 1 of this embodiment, the chamfer widths of the chamfers 3Ba, 3Bb are formed changing gradually in the tire circumferential direction between each of the first auxiliary grooves 5A and between each of the second auxiliary grooves 5B, and are arranged inverted at the opening edges on both sides of the second circumferential groove 3B.

According to this pneumatic tire 1, the chamfers 3Ba, 3Bb are formed differently from each other being inverted at the opening edges on the two sides of the second circumferential groove 3B, so the snow discharge properties are improved, and the effect of improvement of braking performance on snow-covered road surfaces can be enhanced.

Note that the groove width of the second circumferential groove 3B is formed narrower than those of the first circumferential groove 3A and the third circumferential groove 3C, so the snow discharge properties are improved by the chamfers 3Ba, 3Bb, and the effect of improvement in the braking performance on snow-covered road surfaces can be enhanced.

EXAMPLES

In these working examples, performance tests for braking performance on wet road surfaces, braking performance on snow-covered road surfaces, and braking performance on dry road surfaces were performed on a plurality of types of pneumatic tires under different conditions (see FIGS. 7A-7C).

In these performance tests, a pneumatic tire having a tire size of 205/55R16 was assembled on a 16×6.5 JJ rim, inflated to the regular inner pressure (200 kPa), and mounted on a test vehicle (1600 cc, front engine front wheel drive vehicle).

The method of evaluation of the braking performance on wet road surfaces was to measure the braking distance of the test vehicle from a speed of 100 km/h on a wet road surface test course with a water depth of 1 mm. Evaluations were performed by indexing the measurement results with Conventional Example 1 as the standard score (100). In this evaluation, a larger value indicates preferable performance.

The performance on snow-covered road surfaces was evaluated by measuring braking distance with ABS brakes of the above-described test vehicle from a speed of 40 km/h on a snow-compacted road surface. Evaluations were performed by indexing the measurement results with Conventional Example 1 as the standard score (100). In this evaluation, a larger value indicates preferable performance.

The performance on dry road surfaces was evaluated by measuring braking distance of the above-described test vehicle from a speed of 100 km/h on a dry road surface test course. Evaluations were performed by indexing the measurement results with Conventional Example 1 as the standard score (100). In this evaluation, a larger value indicates preferable performance.

In FIGS. 7A-7C, the pneumatic tires that were used as the test tires included five land portions formed by four circumferential grooves on the tread surface. The land portions included the center land portion disposed on the tire equatorial plane CL, the middle land portions disposed adjacent to the center land portion on the two sides in the tire width direction, and the shoulder land portions disposed adjacent to the middle land portions on the outer sides in the tire width direction.

The pneumatic tire of Conventional Example 1 shown in FIGS. 7A-7C was provided with narrow grooves (taken to be third narrow grooves) in either of the middle land portions communicating with one of the circumferential grooves and terminating in the center of the middle land portion, and auxiliary grooves (taken to be the fifth auxiliary grooves) communicating with another circumferential groove and terminating in the center of a middle land portion. The third narrow grooves and fifth auxiliary grooves had the same groove width, and were disposed in parallel alternately in the tire circumferential direction.

On the other hand, the pneumatic tires of Working Example 1 to Working Example 15 were provided with a set of two narrow grooves (taken to be the third narrow grooves) in either of the middle land portions, communicating with one of the circumferential grooves and terminating in the middle land portion, and auxiliary grooves (taken to be the fifth auxiliary grooves) communicating with another circumferential groove and terminating in the center of the middle land portion, disposed between the terminating ends of the sets of the third narrow grooves in the tire circumferential direction.

Also, in the pneumatic tires of Working Example 16 to Working Example 19, the third narrow grooves and the fifth auxiliary grooves were provided in the center land portion.

Also, in the pneumatic tire of Working Example 1, the third narrow grooves and the fifth auxiliary grooves had the same groove width, and the groove width of the circumferential groove to which the third narrow grooves communicated was the same as that of the circumferential groove to which the fifth auxiliary groove communicated. However in the pneumatic tire of Working Example 2 the groove widths of the third narrow grooves and the fifth auxiliary grooves were different, but the groove width of the circumferential groove to which the third narrow grooves communicated was the same as that of the circumferential groove to which the fifth auxiliary groove communicated. In the pneumatic tires of Working Example 3 to Working Example 19, the groove widths of the third narrow grooves and the fifth auxiliary grooves were different, and the groove width of the circumferential groove to which the fifth auxiliary grooves communicated was narrower than that of the circumferential groove to which the third narrow grooves communicated.

Also, in the pneumatic tires of Working Example 1 to Working Example 3, one set of the third narrow grooves and the fifth auxiliary grooves were disposed in parallel. However in the pneumatic tire of Working Example 4, the set of third narrow grooves is disposed becoming closer towards the terminating ends thereof and were not parallel to the fifth auxiliary grooves. In the pneumatic tires of Working Example 5 to Working Example 19, the sets of third narrow grooves were disposed spreading towards the terminating end portions, and the fifth auxiliary grooves were not parallel to the sets of third narrow grooves. Also, in the pneumatic tires of Working Example 6 to Working Example 19, the angle A from the communicating end portions to the terminating end portions of the sets of third narrow grooves was specified. Also the angle α with respect to the first and the angle β with respect to the second of the set of third narrow grooves and the fifth auxiliary grooves were specified.

Also, in the pneumatic tires of Working Example 1 to Working Example 9, the third narrow grooves were formed as a single straight line. However with the pneumatic tire of Working Example 10 the third narrow grooves were formed in a zigzag manner based on two or more continuous different straight lines. With the pneumatic tire of Working Example 11, the third narrow grooves were formed in a wavy manner based on two or more continuous different curves.

Also, in the pneumatic tires of Working Example 12 to Working Example 19, the third narrow grooves were formed smoothly and continuously of three reference lines, the first reference line, the second reference line, and the third reference line in that order from the communicating end towards the terminating end.

In the pneumatic tires of Working Examples 13 to 19, the angles a, b of the first reference lines and the angles c, d of the third reference lines were specified.

Also, in the pneumatic tires of Working Example 15 to Working Example 19, the groove width of the fifth auxiliary groove became gradually narrower towards the terminating end portion.

In addition, in the pneumatic tires of Working Example 17 to Working Example 19, the groove width of the narrow grooves was formed in the range not less than 0.4 mm and not greater than 1.2 mm.

As shown in the test results of FIGS. 7A-7C, with the pneumatic tires according to the Working Examples 1 to 19, it can be seen that the braking performance on dry road surfaces, wet road surfaces, and snow-covered road surfaces were each achieved.

The invention claimed is:

1. A pneumatic tire, comprising: a first circumferential groove and a second circumferential groove on a tread surface of a tread portion, extending along a tire circumferential direction, and sandwiching a tire equatorial plane; and
 a land portion defined by the first circumferential groove and the second circumferential groove, the land portion being divided by a first plurality of lateral grooves which communicate with both the first circumferential groove and the second circumferential groove to form a block row, a second plurality of lateral grooves being formed in each block of the block row, the second plurality of lateral grooves consisting of:
  narrow grooves formed as a set of two narrow grooves provided intersecting the tire circumferential direction, communicating with the first circumferential groove, and terminating within the land portion; and
  an auxiliary groove provided intersecting the tire circumferential direction, communicating with the second circumferential groove, terminating within the land portion, a terminating end portion of one of the auxiliary grooves being disposed between terminating end portions of each of the sets of the narrow grooves in the tire circumferential direction.

2. The pneumatic tire according to claim 1, wherein a groove width of the second circumferential groove is formed narrower than that of the first circumferential groove, and a groove width of the narrow grooves is formed narrower than that of the auxiliary grooves.

3. The pneumatic tire according to claim 1, wherein two narrow grooves of each set are formed extending from communicating end portions of the two narrow grooves communicating with the first circumferential groove towards the terminating end portions of each of the sets of the narrow grooves spreading with an angle in a range not less than 10° and not greater than 50°, and
 the auxiliary grooves are formed extending from terminating end portions of the auxiliary grooves towards communicating end portions of the auxiliary grooves at an angle in a range not less than 9° and not greater than 30° with respect to a first narrow groove of each set of the two narrow grooves, and at an angle in a range not less than 1° and not greater than 20° with respect to a second narrow groove of each set of the two narrow grooves.

4. The pneumatic tire according to claim 1, wherein the narrow grooves are formed based on two or more continuous different straight lines or curved lines.

5. The pneumatic tire according to claim 1, wherein each of the narrow grooves are formed smoothly and continuously of three reference lines in order of a first reference line, a second reference line, and a third reference line from the communicating end portion communicating with the first circumferential groove towards the terminating end portion.

6. The pneumatic tire according to claim 5, wherein each of the narrow grooves is formed so that the first reference line extends from the communicating end portion of the narrow groove to an inner side with respect to a straight line connected from the communicating end portion of the narrow groove to the terminating end portion of the narrow groove, and the first reference line and the straight line form an angle in a range not less than 5° and not greater than 20°.

7. The pneumatic tire according to claim 5, wherein each of the narrow grooves is formed so that the third reference line extends from the terminating end portion of the narrow groove to an inner side with respect to a straight line connected from the communicating end portion of the narrow groove to the terminating end portion of the narrow groove, and the third reference line and the straight line form an angle in a range not less than 5° and not greater than 20°.

8. The pneumatic tire according to claim 1, wherein each of the auxiliary grooves are formed with a groove width gradually narrowing from the communicating end portion of the auxiliary groove towards the terminating end portion of the auxiliary groove.

9. The pneumatic tire according to claim 1, wherein a groove width of the narrow grooves is formed in a range not less than 0.4 mm and not greater than 1.2 mm.

10. The pneumatic tire according to claim 1, wherein the narrow grooves terminate at the tire equatorial plane.

11. The pneumatic tire according to claim 10, wherein the auxiliary grooves terminate at the tire equatorial plane.

12. The pneumatic tire according to claim 1, wherein the auxiliary grooves terminate at the tire equatorial plane.

\* \* \* \* \*